US 6,868,039 B2

(12) United States Patent
Broto

(10) Patent No.: US 6,868,039 B2
(45) Date of Patent: Mar. 15, 2005

(54) METHOD FOR DETERMINING A SEISMIC WAVE VELOCITY MODEL IN A HETEROGENEOUS UNDERGROUND

(75) Inventor: Karine Broto, Rueil Malmaison (FR)

(73) Assignee: Institut Francais du Petrole, Rueil Malmaison Cedex (FR)

(*) Notice: Subject to any disclaimer, the term of this patent is extended or adjusted under 35 U.S.C. 154(b) by 0 days.

(21) Appl. No.: 10/830,052

(22) Filed: Apr. 23, 2004

(65) Prior Publication Data

US 2004/0243313 A1 Dec. 2, 2004

(30) Foreign Application Priority Data

Apr. 29, 2003 (FR) .............................................. 03 05292

(51) Int. Cl.$^7$ ................................................. G01V 1/28
(52) U.S. Cl. .............................. 367/73; 702/14; 702/18
(58) Field of Search ............................. 367/73; 702/14, 702/18

(56) References Cited

U.S. PATENT DOCUMENTS

| | | | |
|---|---|---|---|
| 5,136,553 A | | 8/1992 | Kelly et al. |
| 5,197,039 A | | 3/1993 | Corcoran et al. |
| 6,094,400 A | * | 7/2000 | Ikelle .......................... 367/75 |
| 2004/0199330 A1 | * | 10/2004 | Routh et al. ................... 702/14 |

FOREIGN PATENT DOCUMENTS

EP          1239304          9/2002

OTHER PUBLICATIONS

Kosloff et al., "Uncertainty in Determining Interval Velocities From Surface Reflection Seismic Data", XP–002270909, Geophysics, vol. 67, No. 3, May–Jun. 2002, pp. 952–963.

Eckhardt, "Velocity Model Updating Using Image Gathers", XP 000619878, Geophysical Prospecting, 1994.

* cited by examiner

*Primary Examiner*—Ian J. Lobo
(74) *Attorney, Agent, or Firm*—Antonelli, Terry, Stout & Kraus, LLP

(57) ABSTRACT

A method for determining a velocity model of seismic waves picked up by seismic receivers coupled with an underground formation, in response to the emission of seismic waves in the subsoil by a seismic source, after reflection on geologic interfaces of the formation, from multi-offset records of these waves is disclosed. From picking the seismic records of one or more events for different source-pickup pairs associated with the weakest offset of a seismic acquisition device, the geometry of the events is predicted for the total range of offsets of the acquisition device and for different velocity values taken around a reference layer velocity, by means of kinematic inversion and modelling techniques. Then, for different lateral positions of the acquisition device, the predicted travel time curve best approaching the seismic event considered is selected. The travel times thus obtained are then supplied to a prestack inversion method such as a travel time tomography.

28 Claims, 1 Drawing Sheet

METHOD FOR DETERMINING A SEISMIC WAVE VELOCITY MODEL IN A HETEROGENEOUS UNDERGROUND

BACKGROUND OF THE INVENTION

1. Field of the Invention

The present invention relates to a method allowing determination of a velocity model of seismic waves picked up by receivers coupled with an underground formation, from multi-offset records of these waves.

2. Description of the Prior Art

Seismic reflection surveys are widely used in petroleum exploration, notably to produce images of the subsurface from the information contained in the waves propagated and reflected from the geologic discontinuities of the subsoil.

More precisely, imagery methods use the kinematic information associated with the major seismic reflections (that is the travel times of the waves reflected on the main discontinuities of the subsoil) to determine a velocity macromodel of the subsoil, which will be used to convert the temporal seismic records to a depth image of the subsurface.

Access to the kinematic information necessary for determination of the velocity model requires interpretation of the seismic events in the seismic multi-offset records. Now, seismic multi-offset data is generally characterized by a bad signal-to-noise ratio, hence the failure of conventional automatic picking and the necessity of carrying out a long and costly manual picking of the seismic data. Besides, for 3D seismic surveys (currently predominant in relation to 2D surveys), the quantity of data to be interpreted is a 4D volume that can reach sizes of the order of one hundred gigabytes, or even of the order of a terabyte, which makes the interpretative task even longer and tedious.

In order to avoid this stage of seismic multi-offset collection interpretation, geophysicists have developed methods based on approximations of the geometry of the seismic events in the multi-offset collections. To establish these approximations, these methods put forward hypotheses on the subsoil complexity, hypotheses which can relate to the geometry of the geologic discontinuities of the subsoil and to the layer velocity variations. The method described by Taner and Kohler (1969) can for example be mentioned, which assumes a stratified medium of horizontal plane layers with homogeneous and isotropic layer velocities, as well as the method described by Levin (1971) which extends the previous method to sloping layers. Other variants have been proposed, but generally the existing methods are based on a hyperbolic hypothesis of the travel time curve in the multi-offset collections. This hypothesis is however violated from the moment that the geologic discontinuities of the subsoil are no longer plane and/or that the layer velocities exhibit lateral variations.

SUMMARY OF THE INVENTION

The invention is a method for best approaching the travel times of the multi-offset collections in cases where the geologic discontinuities of the subsoil have any geometry and where the layer velocities are moderately variable laterally, while limiting the human time required for interpretation of the seismic records. The travel times obtained are then treated by means of a prestack kinematic inversion method taking account of complex kinematics, such as travel time tomography, described for example in the following document:

Bishop, T. et al., 1985, "Tomographic Determination of Velocity and Depth in Laterally Varying Media", Geophysics, 50 No. 6, 903–923.

The method can also apply in cases where the layer velocities are laterally variable, but iteratively, the velocity model after updating at a given iteration by applying a prestack kinematic inversion method such as the aforementioned reflection tomographic method serving as the initial model for the next iteration.

The method of the invention allows easier access to the prestack kinematic information associated with the events contained in the seismic records, which is combined with a prestack kinematic inversion technique for imagery of the geologic interfaces of the subsoil.

What is referred to as "prestack kinematic information" is the travel times associated with the reflections recorded by source-pickup pairs located at variable distances from one another. Contrasting of "easier access" with manual picking of the seismic events in the multi-offset collections is performed. A "prestack kinematic inversion method" is understood to be a method allowing, from the kinematic information extracted from the seismic records (and not from an approximation of this kinematic information), to find the geometry of the associated reflectors and the layer velocities.

The method according to the invention allows determination a velocity model of seismic waves picked up by seismic receivers coupled with an underground formation, in response to the emission of seismic waves in the subsoil by a seismic source, after reflection by geologic interfaces of the formation, from multi-offset records of these waves.

For each seismic event located in the records and for each layer delimited by interfaces, the method comprises at least the following steps:

a) from the prestack seismic records, constructing an iso-offset collection from which kinematic information or travel times associated with the event are extracted;

b) selecting a velocity range around a reference velocity in the layer, that is sampled with a predetermined interval;

c) for each velocity sample, applying an inversion technique at a fixed velocity so as to determine, from the travel times extracted from the iso-offset collection, a geometry of the interface for the velocity sample concerned in order to obtain a series of interface/velocity pairs for the event;

d) calculating kinematic information associated with each interface/velocity pair obtained, for source-receiver pairs corresponding to multi-offset collections existing in the seismic records;

e) for each interface/velocity pair and for each multi-offset collection selected, evaluating the coherence between the multi-offset travel times thus calculated and the seismic records, and selecting for each multi-offset collection the travel time curve showing maximum coherence with the seismic records;

f) applying a prestack kinematic inversion method using the multi-offset travel times obtained for all the multi-offset collections selected, in order to determine the geometry and the velocity of the layer considered; and g) iterating n times (n≧0) steps a) to f) by considering on each iteration the velocity model obtained during the previous iteration as the reference model to define the reference velocity of the new iteration.

According to an implementation mode suitable in cases where the velocity range selected is not precise enough at the end of either the previous iteration or of step a) to f), step g) is carried out n times with n≧1.

According to another implementation mode suitable in cases where the velocity distribution varies greatly laterally and/or in cases where no sufficiently precise a priori knowledge of the velocity distribution in the layer considered is available, step g) is carried out on offset ranges that are increasingly greater as iterations progress.

According to another implementation mode suitable in cases where the velocity distribution varies greatly laterally and/or in cases where no sufficiently precise a priori knowledge of the velocity distribution in the layer considered is available, step g) is carried out on multi-offset collection grids that are increasingly finer as iterations progress.

According to an implementation mode suitable in cases where the interface geometry which is sought generates .triplications, step e) is carried out by considering the triplication branches in the multi-offset collections independently of one another. For example, ray tracing and inversion tools allowing taking into account of the multi-valuated arrivals are used.

According to an implementation example, a zero-offset or a near-offset iso-offset collection is preferably constructed in step a).

According to another implementation example, a fixed-velocity kinematic inversion technique such as a map migration is advantageously applied in step c).

According to another implementation example, the kinematic information is calculated in step d) by tracing multi-offset rays on the interface of each interface-velocity pair.

According to another implementation example, step f) is advantageously carried out by applying a prestack kinematic inversion method such as a prestack travel time tomography.

In its most general definition corresponding to the case where the number n of iterations to be carried out may possibly be zero, the method applies for example if the velocity distribution in each layer is hardly variable laterally and/or in the case where a sufficiently precise a priori on the velocity distribution in the layer considered is available.

In a more restrictive sense where the number n of iterations to be carried out is at least 1, the method applies for example in the case where the velocity distribution in the layers of the geologic formation is greatly variable laterally and/or in the case where no sufficient a priori on the velocity distribution in the layer considered is available.

BRIEF DESCRIPTION OF THE DRAWINGS

Other features and advantages of the method according to the invention will be clear from reading the description hereafter of non limitative embodiment examples, with reference to the accompanying drawings wherein.

DETAILED DESCRIPTION OF THE INVENTION

Figure 1A:
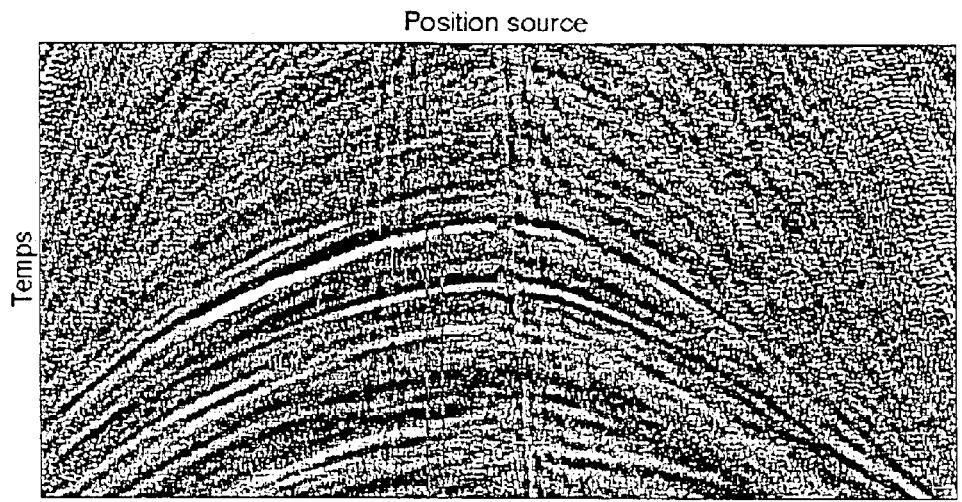
FIGS. 1a to 1c respectively show an application of the method to a common receiver type multi-offset collection (FIG. 1a), to a common receiver collection on which are superposed the multi-offset travel times obtained with various layer velocity values (FIG. 1b) and to a common receiver collection on which is superposed the predicted multi-offset travel time curve showing the greatest coherence with the seismic event considered (FIG. 1c).
Figure 1B:
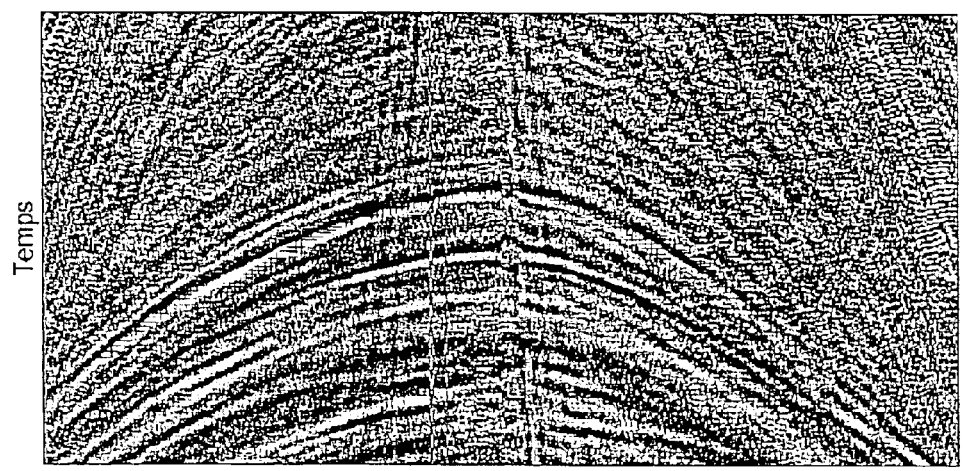
Figure 1C:
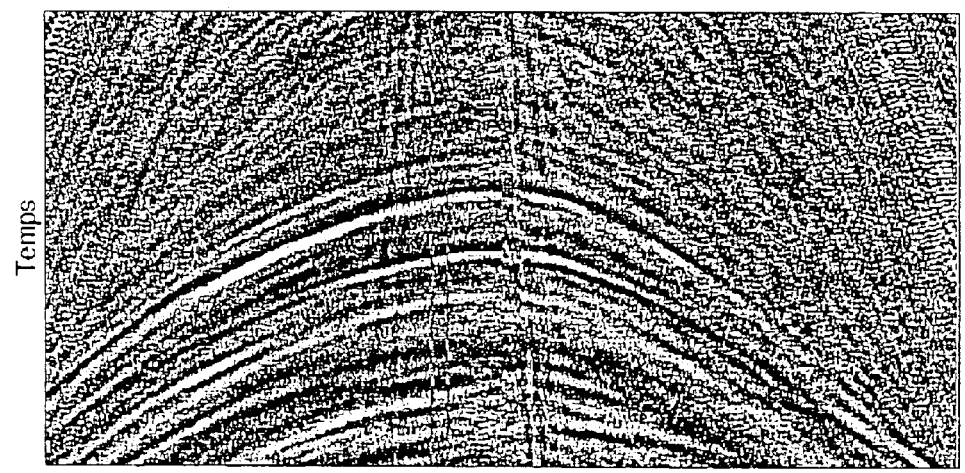

Seismic records are obtained by means of a seismic device comprising a seismic source emitting seismic waves propagated in the subsoil, a set of seismic receivers are coupled with the medium which pick up the waves reflected by the subsoil discontinuities in response to the waves emitted, and a laboratory is used for recording the picked up seismic signals.

I-Standard Case

A first implementation mode of the method is described, in the case where the velocity distribution in the geologic formation preceding the layer being examined is known or has been estimated otherwise, the geometry of the layer in question generating no triplications, the velocity to be determined being slightly variable laterally or a sufficiently precise a priori on this velocity being available. The following steps are carried out:

I-1 From the prestack or multi-offset seismic records, a collection of constant offset, is constructed preferably zero-offset (in reality an approximation of a zero-offset collection, known as a stack, characterized by a better signal-to-noise ratio than the individual iso-offset sections) or near-offset (corresponding to the lowest offset of the multi-offset records).

If a coherent and sufficiently complete interpretation of the seismic event in progress can be carried out in this collection, picking is directly performed in this collection. In the opposite case, in order to gain access to the travel times associated with the event in question, a detour can be made via the time or depth migrated domain, followed by a time or depth demigration, as in the method described in:

Ehinger, A., and Lailly, P., 1995, Velocity Model Determination by the SMART Method, Part 1: Theory: $65^{th}$ Ann. Internat. Mtg., Soc. Expl. Geophys., Expanded Abstracts, pp. 739–742.

I-2 A reference velocity is selected for the layer in question, as well as an uncertainty of this reference velocity and a sampling interval for the velocity range thus formed. Thus a series of velocity samples for the layer in question is obtained; the reference velocity can be any velocity (that is, laterally and vertically variable); in particular, if a velocity distribution obtained otherwise is available, this velocity can be used as the reference velocity; if no a priori information is available for the velocity of the layer, a laterally and vertically homogeneous reference velocity can, for example, be taken.

I-3 For each velocity sample, a fixed-velocity type kinematic inversion technique such as a map migration for example is applied in order to determine, from the travel times extracted from the constant-offset section, the geometry of the interface for the velocity sample in question. Thus a series of interface/velocity pairs for the event in question is obtained. A description of map migration can for example be found in the following reference:

Yilmaz, O., 2001, Seismic Data Analysis—Processing, Inversion and Interpretation of Seismic Data: Society of Exploration Geophysicists.

It may be impossible to find an interface model explaining the travel times for the fixed velocity in progress (impossibility of reaching convergence). For a higher efficiency of the method, it is possible to select only interface/velocity pairs for which the difference between the travel times observed and the travel times calculated on the model obtained after convergence is below a certain threshold.

It can be noted that this fixed-velocity inversion can also be carried out by means of any other equivalent kinematic technique.

I-4 The kinematic information associated with each interface/velocity pair obtained for example by means of multi-offset ray tracing on the interface of each interface/velocity pair thus obtained and for source-receiver pairs corresponding to multi-offset collections existing in the seismic records is calculated. Common midpoint collections are preferably used, in particular if the real velocity shows lateral variations that are not taken into account in the reference model.

I-5 For each interface/velocity pair and for each multi-offset collection selected, the coherence between the multi-offset travel times thus calculated and the seismic records is evaluated. A technique referred to as semblance calculation technique can for example be used, wherein the energy encountered in the seismic data along a curve that corresponds here to the multi-offset travel times calculated by ray tracing is summed. In an ideal case, there will be a velocity sample for which the predicted travel time curve is perfectly superposed on the seismic event considered, which will translate into a maximum coherence measurement. It can be noted that this evaluation can be performed on a limited offset range, defined by the user or automatically, for example by examining the curve showing the evolution of the coherence as a function of the offset range.

For each multi-offset collection, the travel time curve which best matches the seismic records is selected, and the multi-offset travel times forming this curve are reserved. It can be noted that the travel time curve exhibiting the best coherence can be adjusted if necessary by seeking in a predetermined vertical window the closest amplitude maximum (or minimum, depending on the polarity of the event considered) for each seismic trace of the multi-offset collection considered.

I-6 The multi-offset travel times thus collected for all the multi-offset collections selected are then injected into a prestack kinematic inversion method such as a travel time tomography in order to determine the geometry and the velocity of the layer in question.

I-7 The previous stages may have to be iterated if the coherence with the seismic records is not considered to be globally satisfactory by the operator.

II-Particular Cases

II-1 In cases where the velocity distribution in the layers of the geologic formation is greatly variable laterally and/or where no sufficiently precise a priori on the velocity distribution in the layer considered is available, the method according to the invention comprises the following steps:

The previous stages are applied iteratively, the travel times collected during an iteration being used for updating the velocity model by means of a prestack kinematic inversion method such as travel time tomography, a model which is then used as the input velocity model for a new iteration of the method.

It can be noted that, in order to be free from the effects of the lateral velocity variations that might have a smaller wavelength than the maximum offset of the multi-offset collections, the offset range considered by the method can be widened as the iterations progress. More precisely, the method is initiated on a limited offset range, then the velocity distribution found from this limited offset range is used as the reference model for a new iteration of the method during which a wider offset range will be considered, and so forth. It can be noted that the offset range considered at a given iteration can be selected for example by examining the curve showing the evolution of the coherence as a function of the offset range.

For the cases where the velocity distribution varies greatly laterally, it is possible to adopt furthermore a multi-grid approach, more precisely, the method is initiated on a loose grid of multi-offset collections (in order to determine the great wavelengths of the velocity variations), then multi-offset collection grids that are increasingly finer as iterations progress are taken into account.

II-2 In the case where the sought interface geometry generates triplications and if it is also desired to determine the zones of the layer considered generating these triplications, it is first and foremost necessary to have inversion methods such as (fixed-velocity and prestack) kinematic inversion methods for example, allowing to take account of multi-valued arrivals. Such a method is described in the following reference:

Delprat-Jannaud, F. and Lailly, P., (1995), How to Handle Multiple Arrivals Journal of Geophysical Research, 100, No. B1, 703–715.

The input data of this type of method are the multi-valuated travel times associated with the seismic events considered, and the ray parameters associated with these travel times. In order to obtain the multi-valuated travel times and the ray parameters associated with the constant-offset data, a migration-demigration loop can be used (as described in the aforementioned method by Ehinger and Lailly (1995)) by carrying out the demigration stage by means of ray tracing allowing calculation of multi-valuated arrivals. Such ray tracing is for example described in:

Jurado, F., Lailly, P., and Ehinger, A., (1998), Fast 3D Two Point Raytracing forTravel Time Tomography: Proceedings of SPIE, Mathematical Methods in Geophysical Imaging V, 3453, 70–81.

Then, after forming the various interface/velocity pairs by kinematic inversion at fixed velocity on the obtained time/ray parameters data, the kinematic information is calculated as described in the most general case by means, for example, of multi-offset ray tracing in each one of these models and for each multi-offset collection selected, but this time adapted to the multi-valuated arrival calculations as described in the aforementioned document by Jurado et al. (1998). Both prestack multi-valuated travel times and their associated ray parameters are thus obtained for each multi-offset collection selected.

Then, the coherence analysis between the travel time curves thus predicted and the events considered in the seismic data is carried out as described in the most general case, but independently for each branch of the multi-valuated arrivals. The travel times thus collected for each branch of the multi-valuated arrivals are then injected, with their associated ray parameters, in a prestack kinematic inversion method allowing taking account of the multi-valuated arrivals, as described in the aforementioned document by Delprat-Jannaud and Lailly (1995).

An application of the method to determination of a velocity model of seismic waves in an underground formation has been described. It is however obvious that the method can also apply to determination of the velocity of propagation of other types of waves in a heterogeneous model exhibiting discontinuities.

What is claimed is:

1. A method for determining a velocity model of seismic waves picked up by seismic receivers coupled with an underground formation, in response to the emission of subsoil seismic waves by a seismic source, after reflection by geologic interfaces of the formation, from multi-offset records of the waves, for each seismic event located for the multi-offset records and for each layer delimited by the interfaces comprising:

a) from the prestack seismic records, constructing an iso-offset collection from which kinematic information or travel times associated with the event are extracted;

b) selecting a velocity distribution around a reference velocity in the layer, that is sampled with a predetermined interval;

c) for each velocity sample, applying an inversion technique at a fixed velocity so as to determine, from the travel times extracted from the iso-offset collection, a geometry of the interface for the velocity sample in order to obtain a series of interface/velocity pairs for the event;

d) calculating the kinematic information associated with each obtained interface/velocity pair, for source-receiver pairs corresponding to multi-offset collections existing in the multi-offset seismic records;

e) for each interface/velocity pair and for each multi-offset collection selected, evaluating coherence between calculated multi-offset travel times and the seismic records, and selecting for each multi-offset collection a travel time curve showing maximum coherence with the seismic records;

f) applying a prestack kinematic inversion method using the multi-offset travel times obtained for all the multi-offset collections selected, in order to determine a geometry and a velocity of the layer being considered; and g) iterating n times steps a) to f) by considering for each iteration a velocity model obtained during a previous iteration as a reference velocity model to define the reference velocity, and wherein n is an integer.

2. A method as claimed in claim 1, wherein:

step g) is carried out n times in cases where a velocity range selected is not sufficiently precise at an end of a previous iteration or of steps a) to f).

3. A method as claimed in claim 1, wherein:

in cases where the velocity distribution varies laterally and/or in cases where no sufficiently precise a priori knowledge of the velocity distribution in the layer considered is available, step g) is carried out on offset ranges that are increasingly greater as iterations progress.

4. A method as claimed in claim 2, wherein:

in cases where the velocity distribution varies laterally and/or in cases where no sufficiently precise a priori knowledge of the velocity distribution in the layer considered is available, step g) is carried out on offset ranges that are increasingly greater as iterations progress.

5. A method as claimed in claim 1, wherein:

in cases where the velocity distribution varies laterally and/or in cases where no sufficiently precise a priori knowledge of the velocity distribution in the layer considered is available, step g) is carried out on multi-offset collection grids that are increasingly finer as iterations progress.

6. A method as claimed in claim 2, wherein:

in cases where the velocity distribution varies laterally and/or in cases where no sufficiently precise a priori knowledge of the velocity distribution in the layer considered is available, step g) is carried out on multi-offset collection grids that are increasingly finer as iterations progress.

7. A method as claimed in claim 3, wherein:

in cases where the velocity distribution varies laterally and/or in cases where no sufficiently precise a priori knowledge of the velocity distribution in the layer considered is available, step g) is carried out on multi-offset collection grids that are increasingly finer as iterations progress.

8. A method as claimed in claim 4, wherein:

in cases where the velocity distribution varies laterally and/or in cases where no sufficiently precise a priori knowledge of the velocity distribution in the layer considered is available, step g) is carried out on multi-offset collection grids that are increasingly finer as iterations progress.

9. A method as claimed in claim 1, wherein:

in step e), in cases where an interface geometry which is sought generates triplications, triplication branches in the multi-offset collections are considered independently of one another.

10. A method as claimed in claim 2, wherein:

in step e), in cases where an interface geometry which is sought generates triplications, the triplication branches in the multi-offset collections are considered independently of one another.

11. A method as claimed in claim 3, wherein:

in step e), in cases where an interface geometry which is sought generates triplications, the triplication branches in the multi-offset collections are considered independently of one another.

12. A method as claimed in claim 4, wherein:

in step e), in cases where an interface geometry which is sought generates triplications, the triplication branches in the multi-offset collections are considered independently of one another.

13. A method as claimed in claim 5, wherein:

in step e), in cases where an interface geometry which is sought generates triplications, the triplication branches in the multi-offset collections are considered independently of one another.

14. A method as claimed in claim 6, wherein:

in step e), in cases where an interface geometry which is sought generates triplications, the triplication branches in the multi-offset collections are considered independently of one another.

15. A method as claimed in claim 7, wherein:

in step e), in cases where an interface geometry which is sought generates triplications, the triplication branches in the multi-offset collections are considered independently of one another.

16. A method as claimed in claim 8, wherein:

in step e), in cases where an interface geometry which is sought generates triplications, the triplication branches in the multi-offset collections are considered independently of one another.

17. A method as claimed in claim 9, wherein:

step e) is carried out using ray tracing and inversion tools allowing taking account of multi-valued arrivals.

18. A method as claimed in claim 1, wherein:

a zero-offset or a near-offset iso-offset collection is constructed in step a).

19. A method as claimed in claim 2, wherein:

a zero-offset or a near-offset iso-offset collection is constructed in step a).

20. A method as claimed in claim 3, wherein:

a zero-offset or a near-offset iso-offset collection is constructed in step a).

21. A method as claimed in claim 5, wherein:

a zero-offset or a near-offset iso-offset collection is constructed in step a).

22. A method as claimed in claim 9, wherein:

a zero-offset or a near-offset iso-offset collection is constructed in step a).

23. A method as claimed in claim 17, wherein:

a zero-offset or a near-offset iso-offset collection is constructed in step a).

24. A method as claimed in claim 1, wherein:

a fixed-velocity kinematic inversion technique is applied in step c).

25. A method as claimed in claim 1, wherein:

the kinematic information is calculated in step d) by tracing multi-offset rays on an interface of each interface-velocity pair.

26. A method as claimed in claim 1, wherein:
step f) is carried out by applying a prestack kinematic inversion method.

27. A method in accordance with claim 24, wherein:
the fixed-velocity kinematic inversion technique is map migration.

28. A method in accordance with claim 26, wherein:
the prestack kinematic inversion method is prestack travel time tomography.

* * * * *